(12) United States Patent
Fujino et al.

(10) Patent No.: US 6,540,386 B2
(45) Date of Patent: Apr. 1, 2003

(54) LAMP HAVING REFLECTORS INDEPENDENTLY ADJUSTABLE IN THE HORIZONTAL DIRECTION AND CONCURRENTLY ADJUSTABLE IN THE VERTICAL DIRECTION

(75) Inventors: Yuji Fujino, Shizuoka (JP); Takasumi Aoki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/983,403

(22) Filed: Oct. 24, 2001

(65) Prior Publication Data

US 2002/0054496 A1 May 9, 2002

(30) Foreign Application Priority Data

Oct. 24, 2000 (JP) ........................................ 2000-323989

(51) Int. Cl.$^7$ .................................................. F21S 8/10
(52) U.S. Cl. ........................... 362/525; 362/43; 362/45; 362/50; 362/523; 362/529
(58) Field of Search ................................. 362/524, 525, 362/528, 529, 239, 241, 250, 449, 43, 45, 50, 523

(56) References Cited

U.S. PATENT DOCUMENTS

| | | | |
|---|---|---|---|
| 4,774,639 A | | 9/1988 | Baur et al. ..................... 362/66 |
| 4,839,785 A | * | 6/1989 | Ohishi ......................... 362/528 |
| 4,882,658 A | * | 11/1989 | Allen ........................... 362/524 |
| 4,916,586 A | * | 4/1990 | Van Duyn et al. .......... 362/524 |
| 6,220,735 B1 | | 4/2001 | Matubara .................... 362/523 |

* cited by examiner

Primary Examiner—Sandra O'Shea
Assistant Examiner—Ismael Negron
(74) Attorney, Agent, or Firm—Sughrue Mion, PLLC

(57) ABSTRACT

A vehicular headlamp wherein aiming adjustment of two reflectors can be conducted accurately regardless of the positional relation between aiming screws operating in conjunction with each other. The headlamp includes first and second reflectors mounted in a lamp chamber defined by a lamp body opening at its front and a lens covering the front opening of the lamp body, the reflectors each being tiltable by turning of an aiming screw of a corresponding aiming mechanism that supports the corresponding reflector in a tiltable manner relative to the lamp body. A belt mechanism rotationally couples the two aiming screws for allowing the first aiming screw for tilting the first reflector and the second aiming screw for tilting the second reflector to be turned in conjunction with each other.

17 Claims, 4 Drawing Sheets

LAMP HAVING REFLECTORS INDEPENDENTLY ADJUSTABLE IN THE HORIZONTAL DIRECTION AND CONCURRENTLY ADJUSTABLE IN THE VERTICAL DIRECTION

BACKGROUND OF THE INVENTION

The present invention relates to a vehicular headlamp. More particularly, the present invention relates to a vehicular headlamp having improved aiming adjustment of two reflectors in a vehicular headlamp including first and second reflectors, the reflectors each being tiltable by turning an aiming screw of a corresponding aiming mechanism that supports the corresponding reflector in an adjustably tiltable manner relative to the lamp body.

One type of vehicular headlamp has two reflectors arranged so as to be separately tiltable within a single lamp-fixture chamber defined by a lamp body having a recessed portion at its front and a lens covering the front opening of the lamp body. Such a headlamp may be used, for example, in a so-called four-lamp headlamp system having a main-beam reflector and a sub-beam reflector arranged on each of the right and left front portions of the automobile.

In such a headlamp, the two reflectors are supported in a tiltable manner on the lamp body via respective aiming mechanisms. Such an aiming mechanism is generally composed of a single pivot fulcrum portion and two spacing adjustment portions. Each spacing adjustment portion is composed of an aiming screw rotatably supported on the lamp body and a nut member into which the aiming screw is fitted. The nut member is attached to the reflector. By turning the aiming screw, a threaded shaft portion of the aiming screw is screwed into or out of the nut member, depending on the direction of rotation, so that the spacing between the portion of the lamp body supporting the aiming screw and the portion of the reflector to which the nut member is attached is adjusted. Accordingly, turning the aiming screw in one spacing adjustment portion tilts the reflector about the line connecting the pivot fulcrum portion and another spacing adjustment portion.

Reflectors are pivotable by the aiming mechanisms as described above for the purpose of enabling adjustment of the radiation axes of the beams from the respective reflectors. If the radiation axes of the beams have not been properly adjusted, the beams of the vehicular headlamp cannot illuminate required portions of the road ahead, or glare may be created for drivers of oncoming vehicles and pedestrians.

Therefore, proper adjustment of the radiation axes of the beams, that is, aiming adjustment, is required for the vehicular headlamp before shipping from the factory, and such aiming adjustment is also required as appropriate after use.

It is troublesome to conduct such an aiming adjustment of the two reflectors separately. In other words, the main beam and the sub beam are capable of producing the best running beams when the radiation axes of the two beams are properly combined and aligned. Therefore, it is quite troublesome and difficult to maintain the desired alignment between the radiation axes while tiltably adjusting the two reflectors separately.

Even if the radiation axes of the two reflectors are properly adjusted prior to shipment from the factory, it is difficult for a general user or mechanic without special instruments to conduct proper adjustment.

Therefore, attempts have been made to provide an aiming mechanism where the two aiming screws of two aiming mechanisms are turned simultaneously in order to adjust the tilt angle of the two reflectors simultaneously. According to one such attempt, the two aiming screws are linked to each other via a plurality of gears so that the rotation of one of the aiming screws causes turning of the other aiming screw via the plurality of gears.

Turning two aiming screws in conjunction with each other facilitates maintaining the proper alignment of the radiation axes of the two reflectors. However, accommodating the gear train within the lamp chamber may be difficult depending on the positional relation between the aiming screws to be operated in conjunction with each other.

Moreover, operating the two aiming screws in conjunction with each other via the gear train increases the number of parts, and also complicates the overall structure.

SUMMARY OF THE INVENTION

It is an object of the present invention to facilitate the aiming adjustment of two reflectors and enable the aiming adjustment to be conducted regardless of the positional relation between aiming screws operating in conjunction with each other.

In order to solve the aforementioned problems, the vehicular headlamp of the present invention includes a belt mechanism for allowing a first aiming screw, for adjusting the tilt angle of the first reflector, and a second aiming screw, for adjusting the tilt angle of the second reflector, to be turned in conjunction with each other.

In the vehicular headlamp of the present invention, turning only one of the aiming screws effects turning of the other aiming screw as well. This facilitates aiming adjustment and allows the aiming adjustment to be conducted without disturbing the alignment of the radiation axes of the two reflectors that have been matched in advance.

The aiming screw indirectly turned via the belt mechanism may be located at a position which is less accessible for direct operation from the outside, thereby improving design flexibility.

Moreover, since the two aiming screws operate in conjunction with each other due to the belt mechanism, it is possible to turn them in conjunction with each other regardless of the positional relation therebetween.

DESCRIPTION OF THE PREFERRED EMBODIMENTS

Hereinafter, preferred embodiments of the vehicular headlamp of the present invention will be described in conjunction with the accompanying drawings. In the embodiments shown in the figures, the present invention is applied to a vehicular headlamp.

The vehicular headlamp 1 is used in a so-called four-lamp headlamp system, and is capable of separately emitting a main beam and a sub beam.

Figure 3:
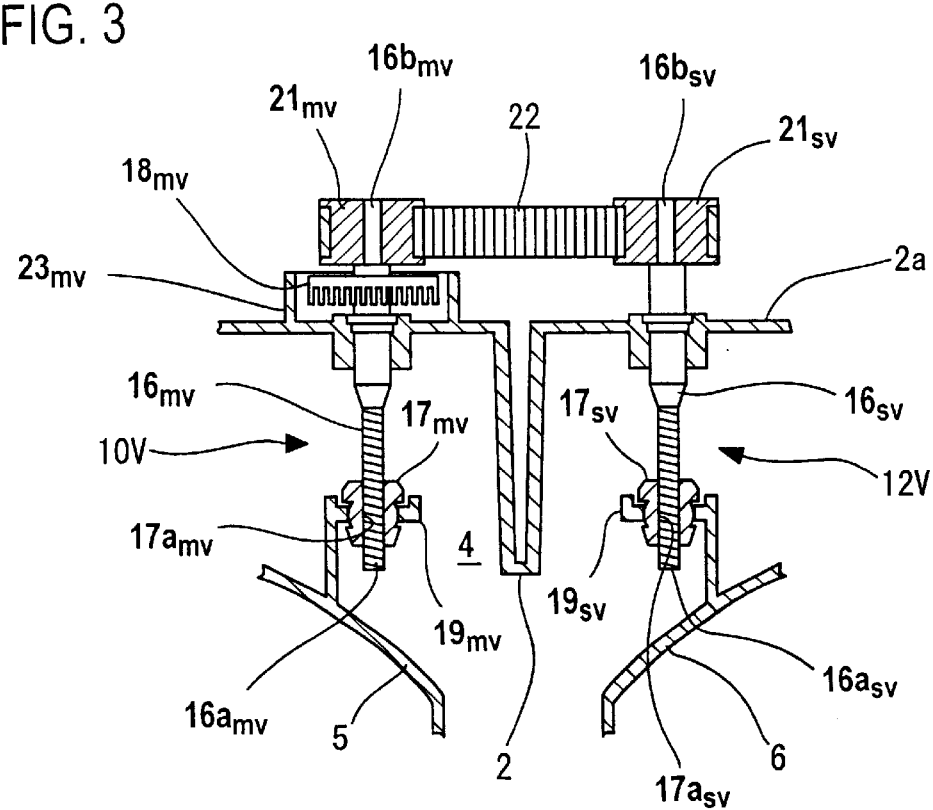
FIG. 3 is a cross-sectional view taken along a line III—III in FIG. 1.
Figure 4:
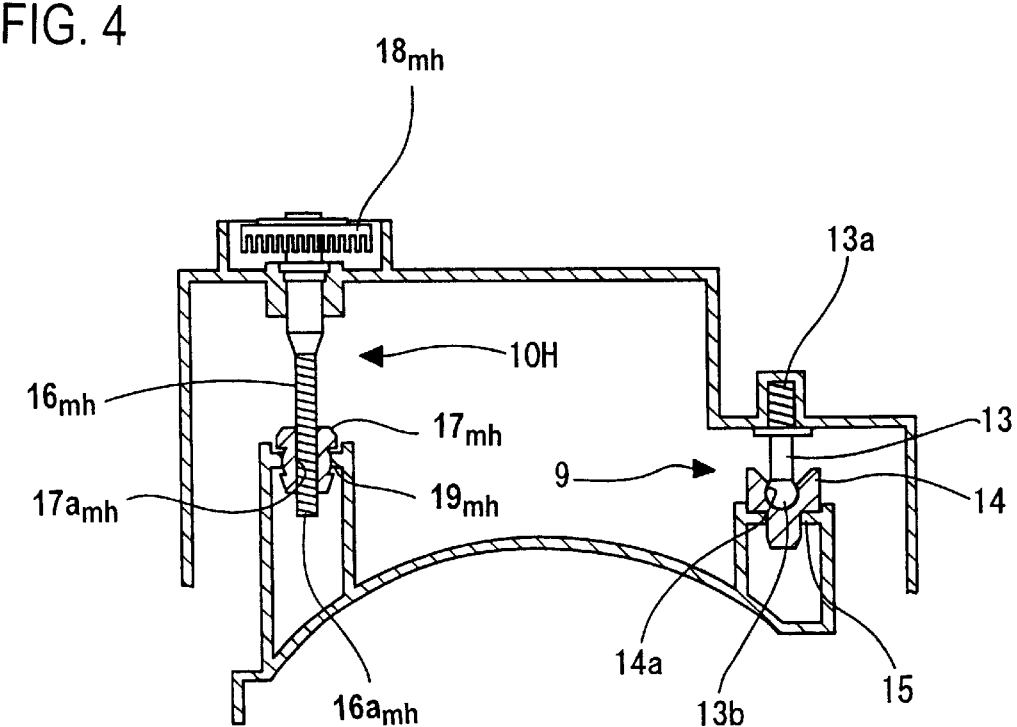
FIG. 4 is a cross-sectional view taken along a line IV—IV in FIG. 1.
Figure 5:
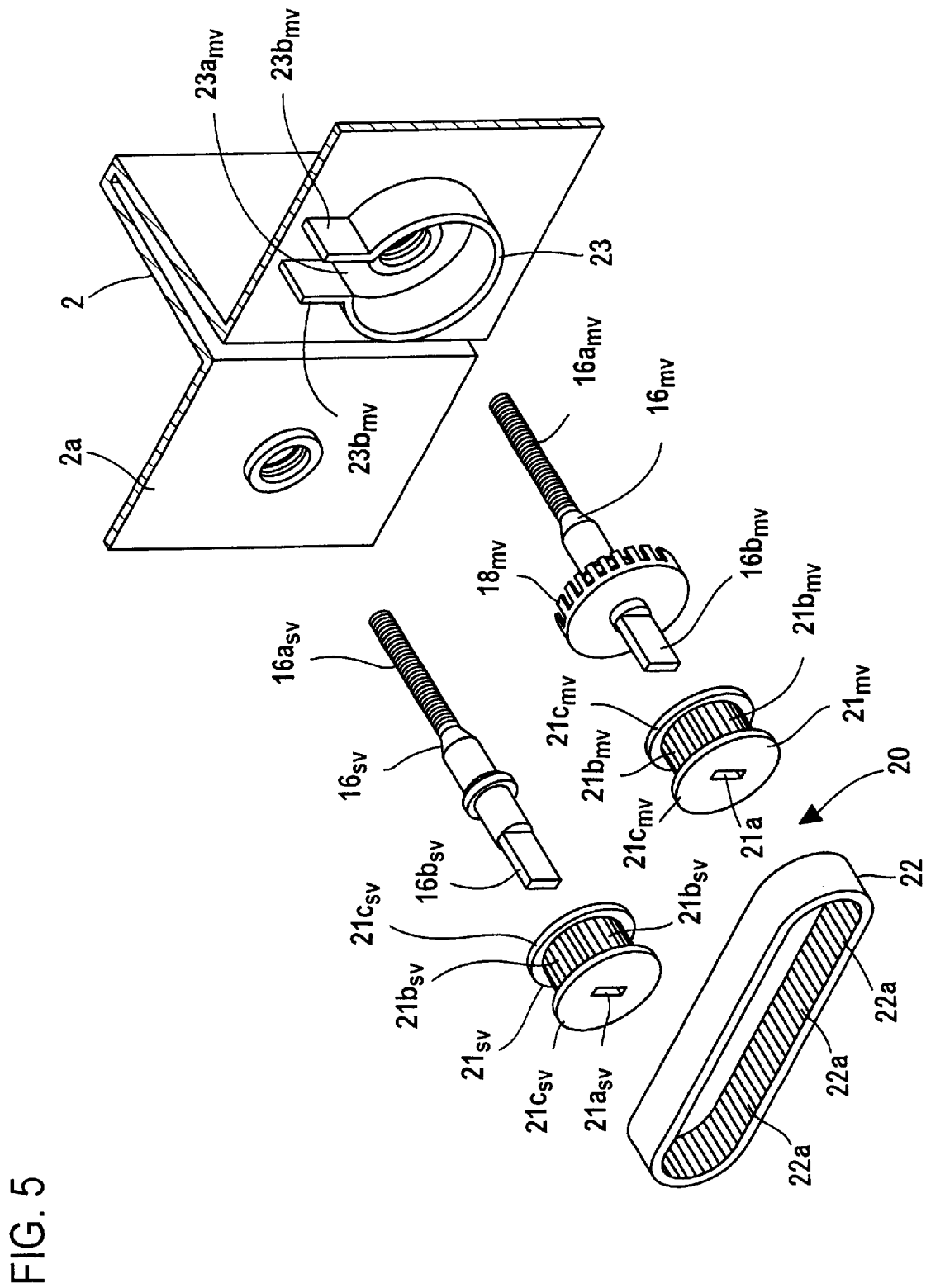
FIG. 5 is an exploded perspective view of a main part of the headlamp of FIG. 2.

A lamp body 2 has a recessed portion at the front, and a lens 3 is attached to the lamp body 2 so as to cover the front opening, thereby forming a lamp-fixture mounting space 4 defined by the lamp body 2 and the lens 3 (see FIGS. 3 and 4).

Figure 1:
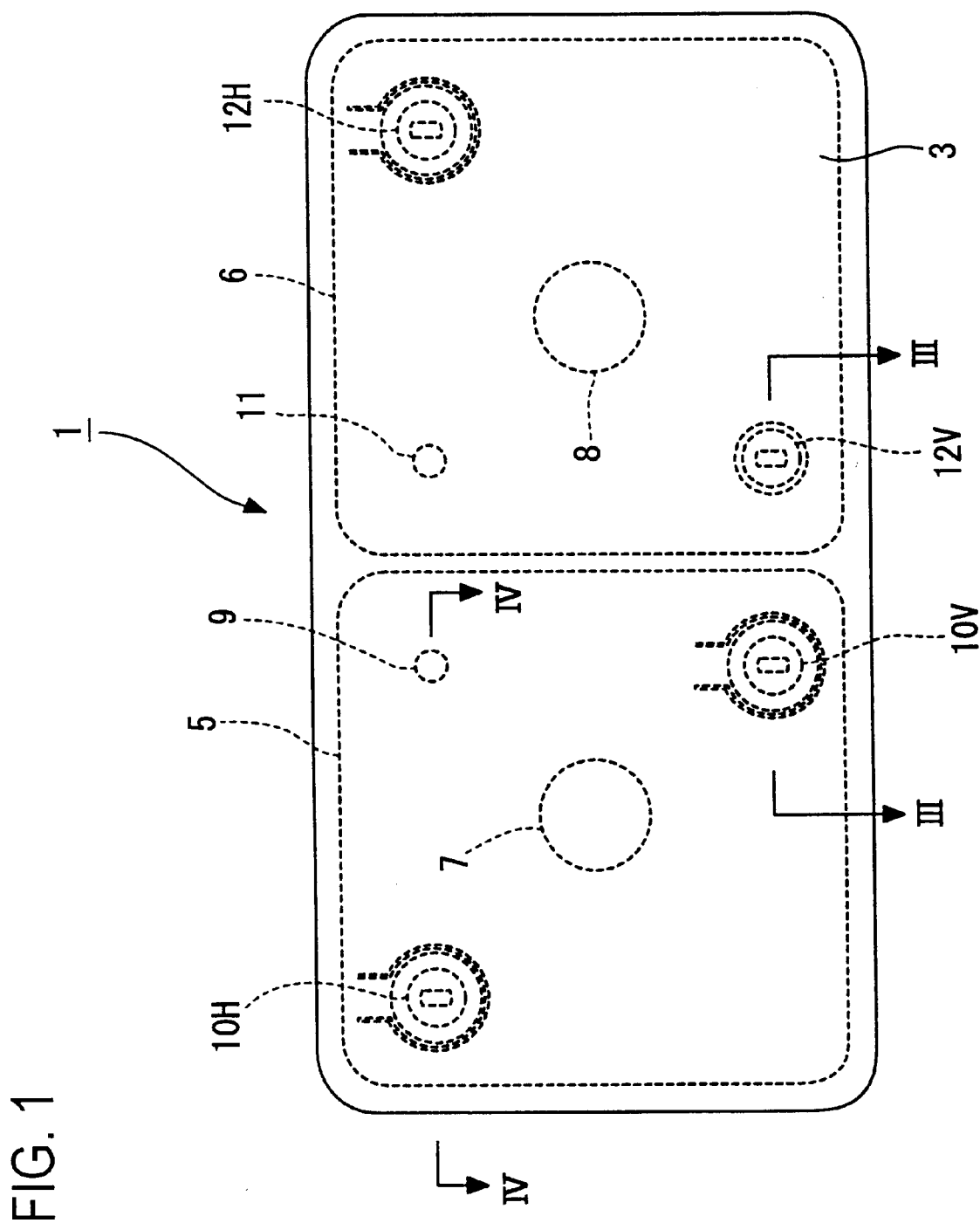
FIG. 1 is a front view of a preferred embodiment of a vehicular headlamp of the present invention.
Figure 2:
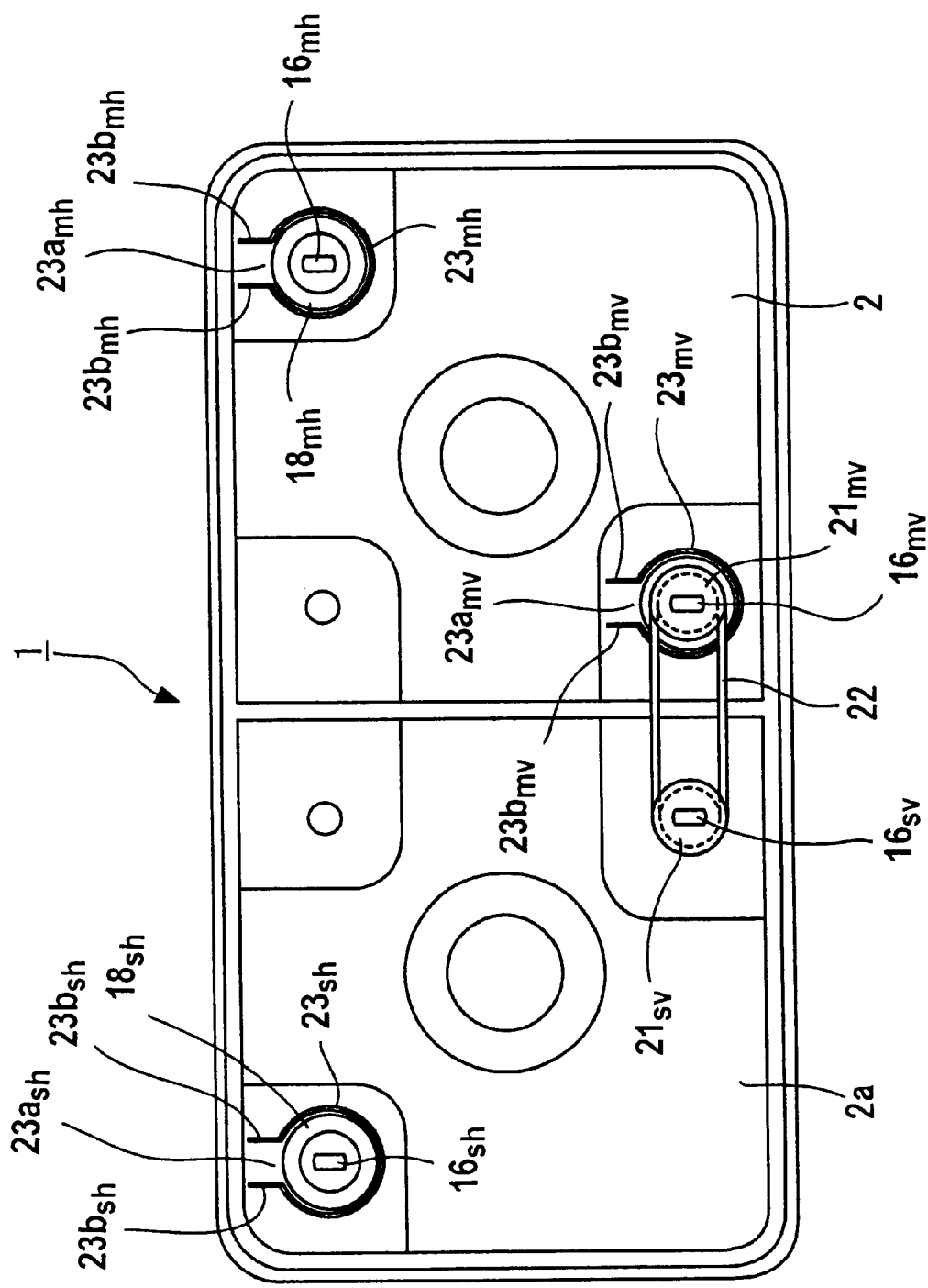
FIG. 2 is a rear view of the headlamp of FIG. 1.

Within the lamp-fixture space 4 are arranged first and second reflectors 5, 6 that are tiltably mounted relative to the lamp body 2. The first and second reflectors 5, 6 support light source bulbs 7, 8, respectively. The combination of the first reflector 5 and the light source bulb 7 produce the main beam, and the second reflector 6 and the light source bulb 8 produce the sub beam. Simultaneously radiating the main beam and the sub beam yields a light distribution pattern suitable for a high beam used when driving on the open road or the like, while just the sub beam forms the low beam that is used when driving in urban areas or when meeting oncoming vehicles (see FIGS. 1, 3 and 4).

Each of the two reflectors 5, 6 is supported on the lamp body 2 by respective aiming mechanisms. Each aiming mechanism is composed of a single pivot fulcrum portion and two spacing adjustment portions. More specifically, the first reflector 5 is supported on the lamp body 2 in a tiltable manner by am aiming mechanism composed of a single pivot fulcrum portion 9 and two spacing adjustment portions 10V, 10H, and the second reflector 6 is supported on the lamp body 2 in a tiltable manner by a single pivot fulcrum portion 11 and two spacing adjustment portions 12V, 12H (see FIG. 1).

The pivot fulcrum portions 9 and 11 are each composed of a fulcrum shaft 13 fixed to the lamp body 2 and a ball-receiving member 14 supported by the reflector 5, 6. The fulcrum shaft 13, which is made of metal, generally has a shaft-like shape with a threaded shaft portion 13a at its rear end and a ball-shaped portion 13b at its front end. The threaded shaft portion 13a is screwed into a rear wall 2a of the lamp body 2. The ball-receiving member 14, which is made of synthetic resin and has a ball-shaped recess 14a at the rear, is supported on a support member 15 projecting from the rear surface of the reflector 5, 6. The ball-shaped portion 13b of the fulcrum shaft 13 is pivotally fitted in the ball-shaped recess 14a of the ball-receiving member 14. Accordingly, the reflector 5 or 6 is connected to the lamp body 2 so as to be pivotable on the fitting portion of the ball-shaped portion 13b of the fulcrum shaft 13 and the ball-shaped recess 14a of the ball-receiving member 14 (see FIG. 4).

The spacing adjustment portions 10V, 12V include respective aiming screws $16_{mv}$, $16_{sv}$ rotatably supported on the lamp body 2 and a nut member 17 supported on the reflector 5, 6. (As used herein, the subscript m indicates main beam, s sub beam, v vertical, and h horizontal.) The aiming screws $16_{mv}$, $16_{sv}$ are made of metal. The front part of each of the aiming screws is mostly formed as a threaded shaft portion $16a_{mv}$, $16a_{sv}$ while the intermediate portion is rotatably supported on the rear wall 2a of the lamp body 2. The aiming screw $16_{mv}$ in the spacing adjustment portion 10V is herein referred to as the first aiming screw, and the aiming screw $16_{sv}$ in the spacing adjustment portion 12V is referred to as the second aiming screw.

Except for the aiming screw of the vertical spacing adjustment portion 12V of the second reflector 6, that is, except for the second aiming screw $16_{sv}$, a crown gear $18_{mv}$, $18_{mh}$, $18_{sh}$ is fixed to a portion of each of the aiming screws 16 that projects rearward from the rear wall 2a of the lamp body 2. The aiming screws $16_{mv}$, $16_{sv}$ of the vertical spacing adjustment portions 10V, 12V of the first and second reflectors 5, 6 have a non-circular cross-section at their respective rear ends $16b_{mv}$, $16b_{sv}$.

The nut member 17, which is made of a synthetic resin and has a lower axial through hole 17a, is supported in a slightly pivotable manner on a support member 19 projecting from the rear surface of the reflector 5, 6.

The threaded shaft portion $16a_{mv}$, $16a_{mh}$, $16a_{sv}$, $16a_{sh}$ of each of the aiming screws $16_{mv}$, $16_{mh}$, $16_{sv}$, $16_{sh}$, is screwed into the lower hole 17a of the respective nut member 17, whereby the reflector 5, 6 is supported on the lamp body 2 so as to allow adjustment of the spacing between the reflector 5, 6 and the rear wall 2a of the lamp body 2. Upon turning the aiming screw of any of the spacing adjustment portions 10V, 10H, 12V, 12H, the threaded shaft portion $16a_{mv}$, $16a_{mh}$, $16a_{sv}$, $16a_{sh}$ of the aiming screw $16_{mv}$, $16_{mh}$, $16_{sv}$ or $16_{sh}$ is screwed into or out of the respective nut member 17, depending on the direction of rotation, so that the spacing between the portion of the aiming screw supported on the lamp body 2 and the nut member is varied. Accordingly, turning the aiming screws $16_{mv}$, $16_{sv}$ of the spacing adjustment portion 10V, 12V causes the reflectors 5, 6 to pivot about the line connecting the pivot fulcrum portions 9, 11 and the spacing adjustment portion 10H, 12H, while turning the aiming screws $16_{mh}$, $16_{sh}$ of the spacing adjustment portion 10H, 12H causes the reflectors 5, 6 to pivot about the line connecting the pivot fulcrum portions 9, 11 and the spacing adjustment portions 10V, 12V. In other words, turning the aiming screws $16_{mv}$, $16_{sv}$ of the spacing adjustment portions 10V, 12V tilts the reflector 5, 6 in the vertical direction, whereas turning the aiming screws $16_{mh}$, $16_{sh}$ of the spacing adjustment portions 10H, 12H tilts the reflectors 5, 6 in the horizontal direction.

The first and second aiming screws for tilting the reflectors 5, 6 in the vertical direction, that is, the aiming screws $16_{mv}$, $16_{sv}$ of the spacing adjustment portions 10V, 12V, are coupled so as to rotate in conjunction with each other through a belt mechanism 20. The spacing adjustment portions 16V and 12V are provided at positions so as have the shortest distance therebetween in the direction in which the two reflectors 5, 6 are arranged in the lamp body in the among the spacing adjustment portions 10V, 10H, 12V, 12H.

The belt mechanism 20 is composed of counter pulleys $21_{mv}$, $21_{sv}$ fixed to the first and second aiming screws $16_{mv}$, $16_{sv}$ and an endless counter belt 22 mounted on the counter pulleys $21_{mv}$, $21_{sv}$.

Each counter pulley $21_{mv}$, $2_{sv}$ has a non-circular connection hole $21a_{mv}$, $21a_{sv}$ in its axial center so that the non-circular end portion $16b_{mv}$, $16b_{sv}$ of the respective aiming screws $16_{mv}$, $16_{sv}$ fixedly fits in the connection hole $21a_{mv}$, $21a_{sv}$. The counter pulleys $21_{mv}$, $21_{sv}$ have axially extending teeth $21_{mv}$, $21_{sv}$ at their peripheral surfaces, and flanges $21c_{mv}$, $21c_{sv}$ projecting from the peripheral edge of both axial end faces.

Teeth 22a extending in the width direction are formed at the inner peripheral surface of the counter belt 22. The counter belt 22 is mounted on the respective outer peripheral surfaces of the two counter pulleys $21_{mv}$, $21_{sv}$ so that its teeth 22a mesh with the teeth $21b_{mv}$, $21b_{sv}$ of the counter pulleys $21_{mv}$, $21_{sv}$. The counter belt 22 is mounted on the counter pulleys $21_{mv}$, $21_{sv}$ so as to be interposed between the flanges $21c_{mv}$, $21c_{sv}$, whereby the counter belt 22 is prevented from being disengaged from the counter pulleys $21_{mv}$, $21_{sv}$.

Surrounding walls $23_{mv}$, $23_{mh}$, $23_{sh}$ are formed on the back surface of the lamp body 2 at positions so as surround the crown gears $18_{mv}$, $18_{mh}$, $18_{sh}$, respectively, that is, the aiming screws of the three spacing adjustment portions 10V, 10H and 12H, respectively. Each of the surrounding walls $23_{mv}$, $23_{mh}$, $23_{sh}$ has an opening $23a_{mv}$, $23a_{mh}$, $23a_{sh}$ at its upper end, and introducing walls $23b_{mv}$, $23b_{mh}$, $23b_{sh}$ are formed extending upward from both sides of the opening $23a_{mv}$, $23a_{mh}$, $23a_{sh}$.

In the vehicular headlamp 1 of the present invention, aiming adjustment of the reflectors 5, 6 is conducted in the following manner.

In order to adjust the tilt angle of the reflector 5 or 6 in the horizontal direction, the aiming screw $16_{mh}$ or $16_{sv}$ in the spacing adjustment portion 10H or 12H is turned. More specifically, the tip of a screwdriver, for example, is inserted between the rear surface of the lamp body 2 and the crown gear $18_{mh}$ or $18_{sh}$ through the space between the introducing portions $23b_{mh}$ or $23b_{sh}$ of the surrounding wall $23_{mh}$ or $23_{sh}$ so as to engage the crown gear $18_{mh}$ or $18_{sh}$. By turning the screwdriver in this manner, the tip thereof rotates the crown gear $18_{mh}$ or $18_{sh}$, whereby the aiming screw $16_{mh}$ or $16_{sh}$ is turned. Thus, the spacing between the reflector 5 or 6 and the rear wall 2a of the lamp body 2 in the spacing adjustment portion 10H or 12H is varied, whereby the reflector 5 or 6 is tilted about the line connecting the pivot fulcrum portion 9 and the spacing adjustment portion 10V or the line connecting the pivot fulcrum portion 11 and the spacing adjustment portion 12V. Accordingly, the radiation axis of the main beam or the sub beam is separately adjusted in the horizontal direction.

In order to adjust the tilt angle of the reflector 5, 6 in the vertical direction, the first aiming screw $16_{mh}$ in the spacing adjustment portion 10V is turned. More specifically, the tip of a screwdriver, for example, is inserted between the rear surface of the lamp body 2 and the crown gear $18_{mv}$ through the space between the introducing portions $23b_{mv}$ of the surrounding wall $23_{mv}$ so as to engage the crown gear 18. By turning the screwdriver in this state, the tip thereof rotates the crown gear 18, whereby the first aiming screw $16_{mv}$ is turned. When the aiming screw 16mv in the spacing adjustment portion 10V is turned, the aiming screw $16_{sv}$ in the spacing adjustment portion 12V is also turned synchronously via the belt mechanism 20. Therefore, the spacing between the reflectors 5, 6 and the rear wall 2a of the lamp body 2 in the spacing adjustment portions 10V, 12V is varied, whereby the reflectors 5, 6 are tilted about the line connecting the pivot fulcrum portion 9 and the spacing adjustment portion 10H or the line connecting the pivot fulcrum portion 11 and the spacing adjustment portion 12H. Accordingly, the radiation axes of the main beam and the sub beam are simultaneously adjusted in the vertical direction.

As has been described above, in the vehicular headlamp 1 constructed according to the present invention, turning the aiming screw $16_{mv}$ in the spacing adjustment portion 10V causes the aiming screw $16_{sv}$ in the spacing adjustment portion 12V to be turned simultaneously via the belt mechanism 20. This enables simultaneous tilting of the two reflectors 5, 6, facilitating the operation for aiming adjustment.

The aiming screw indirectly turned via the belt mechanism, that is, the second aiming screw $16_{sv}$ in the above embodiment, may be located at such a position as is less accessible for direct operation from the outside, thereby improving design flexibility.

Moreover, since the two aiming screws are rotated in conjunction with each other via the belt mechanism, the two aiming screw are rotated simultaneously regardless of the positional relation therebetween.

It is difficult for a general user or mechanical without special instruments to accurately adjust the light distribution of the output beams by separately conducting aiming adjustment of the main beam and sub beam, and adjustment in the vertical direction is particularly difficult. However, in the vehicular headlamp 1 of the invention, the first reflector 5 radiating the main beam and the second reflector 6 radiating the sub beam are tilted synchronously. Therefore, as long as the respective radiation angles of the main beam and the sub beam are accurately adjusted before shipment of the headlamp from the factory, the alignment between the main beam and the sub beam will not be disturbed by the subsequent aiming adjustment. Also, in a case where the aiming screws for adjustment in the horizontal direction are linked to each other via a belt mechanism instead of the aiming screws for adjustment in the vertical direction, the operation for aiming adjustment can be facilitated by simultaneously tilting the reflectors in the same direction.

In the vehicular headlamp 1, one of the two aiming screws $16_{mv}$, $16_{sv}$ operating in conjunction with each other, that is, the aiming screw $16_{mv}$, is capable of being turned directly from the outside. This facilitates a reduction in the number of parts as compared to the case where the aiming screw is turned via a gear mechanism. Thus, the structure is simplified, resulting in a reduced number of potential sources of failure, as well as low manufacturing costs.

To the first aiming screw $16_{mv}$ operated directly from the outside is coupled the belt mechanism at a location behind the crown gear that is fixed to the portion of the first aiming screw $16_{mv}$ projecting from the rear surface of the lamp body 2. This facilitates mounting of the belt 22 on the counter pulleys $21_{mv}$, $21_{sv}$ respectively fixed to the two aiming screws $16_{mv}$, $16_{sv}$, after adjusting the angles of the first reflector 5 and the second reflector 6, that is, the radiation angles of the main beam and the sub beam so that a properly adjusted main beam can be produced by the main and sub beams.

Moreover, the two aiming screws $16_{mv}$, $16_{sv}$ linked to each other via the belt mechanism 20 are the two aiming screws having the shortest distance therebetween in the direction in which the first and second reflectors 5, 6 are arranged in the lamp chamber among the aiming screws of all four aiming mechanisms. This enables a reduction in the size of the belt mechanism 20.

It should be noted that the shape and structure of each portion shown in the above embodiment are only examples of implementations embodying the present invention, and the technical scope of the present invention should not be taken by way of limitation.

As is apparent from the foregoing description, a vehicular headlamp according to the present invention includes first and second reflectors in a lamp chamber defined by a lamp body opened at its front and a lens covering the front opening of the lamp body, the reflectors each being tiltable by the turning of a corresponding aiming screw of a corresponding aiming mechanism that supports the corresponding reflector in a tiltable manner relative to the lamp body. The vehicular headlamp is characterized in that it includes a belt mechanism for allowing a first aiming screw for tilting the first reflector and a second aiming screw for tilting the second reflector to be turned in conjunction with each other.

Accordingly, in the vehicular headlamp of the present invention, turning only one of the aiming screws enables turning of the other aiming screw as well. This facilitates aiming adjustment and allows the aiming adjustment to be conducted without disturbing the matching of the radiation axes of the two reflectors that have been matched in advance at the factory.

The aiming screw indirectly turned via the belt mechanism may be located at such a position as is less accessible for direct operation from the outside, thereby improving design flexibility.

Moreover, since the two aiming screws operate in conjunction with each other via the belt mechanism, it is possible to turn them in conjunction with each other regardless of the positional relation therebetween.

The first and second reflectors are a main-beam reflector and a sub-beam reflector, and the first and second aiming screws tilt the respective reflectors in a vertical direction. Therefore, the relative relation between the main beam and the sub beam will not be disturbed even when the first and second reflectors are tilted in the vertical direction during a subsequent adjustment procedure.

The first and second aiming screws have the shortest distance therebetween in a direction in which the first and second reflectors are arranged in the lamp housing among the aiming screws of the four aiming mechanisms. This enables a reduction in size of the belt mechanism.

Moreover, one of the first and second aiming screws is capable of being turned directly from outside. This enables a reduction in the number of parts as compared to the case where the aiming screw is turned via a gear mechanism.

The two aiming screws extend through a rear wall of the lamp body and are coupled to the belt mechanism at their respective rear ends, and one of the aiming screws is provided with a toothed gear at a location forward of the portion coupled to the belt mechanism outside the lamp body, the toothed gear being provided for turning from the outside. This enables the two aiming screws to be coupled together through the belt mechanism after adjusting the angles of the first reflector and the second reflector such that proper light distribution is obtained from the beams radiated from the two reflectors. Thus, linking the two aiming screws to each other via the belt mechanism is facilitated.

It should further be apparent to those skilled in the art that various changes in form and detail of the invention as shown and described above may be made. It is intended that such changes be included within the spirit and scope of the claims appended hereto.

What is claimed is:

1. A vehicular headlamp comprising: a lamp body having a lamp chamber formed therein and a front opening; a lens covering said front opening; first and second reflectors mounted in said lamp chamber; first and second aiming mechanisms for supporting and adjusting tilt angles of said first and second reflectors, respectively, said aiming mechanisms comprising first and second aiming screws, respectively, rotation of said aiming screws changing a tilt angle of the corresponding reflector; and a belt mechanism for rotationally linking said first aiming screw and said second aiming screw so that said first and second aiming screws turn in conjunction with each other.

2. The vehicular headlamp according to claim 1, wherein said first and second reflectors comprise a main beam reflector and a sub beam reflector, respectively, and wherein said rotation of said first and second aiming screws tilts the respective reflectors in a vertical direction.

3. The vehicular headlamp according to claim 1, further comprising third and fourth aiming mechanisms comprising third and fourth aiming screws, respectively, for adjusting tilt angles of said first and second reflectors, respectively, in directions opposed to directions in which said first and second reflectors are tilted by said first and second aiming mechanisms, said first and second aiming screws having the shortest distance therebetween in a direction in which the first and second reflectors are arranged in said lamp body among said first, second, third and fourth aiming screws.

4. The vehicular headlamp according to claim 1, wherein one of said first and second aiming screws is mounted at a position so as to be capable of being turned directly from outside said lamp body.

5. The vehicular headlamp according to claim 4, wherein said first and second aiming screws extend through a rear wall of said lamp body.

6. The vehicular headlamp according to claim 5, wherein said first and second aiming screw are coupled to said belt mechanism at their respective rear ends.

7. The vehicular headlamp according to claim 6, further comprising a toothed gear provided on one of said first and second aiming screws at a location forward of a portion coupled to said belt mechanism and outside said lamp body, said toothed gear being provided for allowing turning said one of said first and second aiming mechanisms from outside said lamp body.

8. The vehicular headlamp according to claim 1, wherein said belt mechanism comprises first and second counter pulleys mounted on said first and second aiming screws, respectively, and a belt entrained between said first and second counter pulleys.

9. The vehicular headlamp according to claim 8, wherein each of said counter pulleys has a non-circular connection hole at its axial center fitted to a corresponding non-circular end portion of the respective one of said first and second aiming screws.

10. The vehicular headlamp according to claim 9, wherein each of said pulleys has axially extending teeth at a peripheral portion thereof, and wherein said belt has teeth on an inner surface thereof engaging said axially extending teeth of said pulleys.

11. The vehicular headlamp according to claim 10, wherein each of said pulleys comprises flanges projecting from peripheral edge portions thereof.

12. A vehicular headlamp comprising: a lamp body having a lamp chamber formed therein and a front opening; a lens covering said front opening; a main beam reflector and a sub beam reflector mounted in said lamp chamber; first and second aiming mechanisms for supporting and adjusting tilt angles of said main beam and sub beam reflectors, respectively, in a vertical direction, said first and second aiming mechanisms comprising first and second aiming screws, respectively, said first aiming screw having a portion extending outside said lamp body to allow external rotation of said first aiming screw; first and second counter pulleys fitted on each of said first and second aiming screws, respectively, so as to rotate with said first and second aiming screws; a belt entrained between said first and second counter pulleys, whereby effecting rotation of said first aiming screw from outside said lamp body causes corresponding rotation of said second aiming screw; third and fourth aiming mechanisms for supporting and adjusting tilt angles of said main beam and sub beam reflectors, respectively, in a horizontal direction, said third and fourth aiming mechanisms comprising third and fourth aiming screws, respectively, each of said third and fourth aiming screws having a portion extending outside said lamp body to allow external rotation of said third and fourth aiming screws; and first and second pivot fulcrums forming pivot points for said main beam reflector and said sub beam reflector, respectively.

13. The vehicular headlamp according to claim 12, further comprising a toothed gear provided on each of said first, third and fourth aiming screws for allowing turning of said first, third and fourth aiming screws from outside said lamp body.

14. The vehicular headlamp according to claim 12, wherein each of said counter pulleys has a non-circular connection hole at its axial center fitted to a corresponding non-circular end portion of the respective one of said first and second aiming screws.

15. The vehicular headlamp according to claim 14, wherein each of said pulleys has axially extending teeth at a peripheral portion thereof, and wherein said belt has teeth on an inner surface thereof engaging said axially extending teeth of said pulleys.

16. The vehicular headlamp according to claim 15, wherein each of said pulleys comprises flanges projecting from peripheral edge portions thereof.

17. The vehicular headlamp according to claim 16, further comprising a surrounding wall corresponding to each of said first, third and fourth aiming screws, each said surrounding wall being formed on an outer surface of said lamp body around an end of said first, third and fourth aiming screws protruding from said lamp body, each of said surrounding walls having an opening portion from which extend introducing walls.

* * * * *